July 14, 1925.
H. RIEGGER
1,545,523
MEANS FOR TRANSMITTING TIME SIGNALS
Filed Nov. 18, 1924
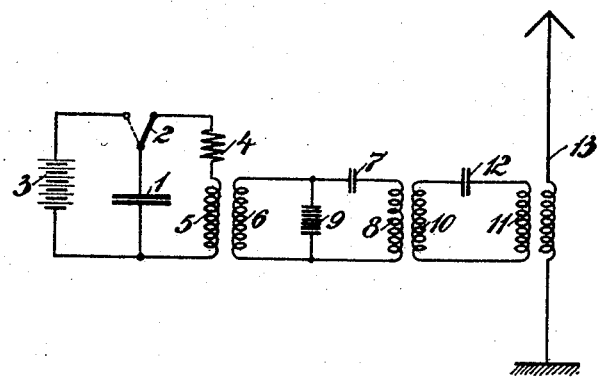
Inventor
Hans Riegger
by Knight Bro.
attorneys Patented July 14, 1925.

1,545,523

UNITED STATES PATENT OFFICE.

HANS RIEGGER, OF PANKOW, NEAR BERLIN, GERMANY, ASSIGNOR TO SIEMENS & HALSKE, AKTIENGESELLSCHAFT, AT SIEMENSSTADT, NEAR BERLIN, GERMANY, A CORPORATION OF GERMANY.

MEANS FOR TRANSMITTING TIME SIGNALS.

Application filed November 18, 1924. Serial No. 750,582.

*To all whom it may concern:*

Be it known that I, HANS RIEGGER, a citizen of the German Empire, residing at Pankow, near Berlin, Germany, have invented certain new and useful Improvements in Means for Transmitting Time Signals, of which the following is a specification.

My invention relates to improvements in means for transmitting time signals. The object of my invention is to transmit such signals with a prescribed accuracy.

According to my invention time signals which demand special accuracy are given by the discharge current of a condenser, the condenser being discharged across a self-induction and an ohmic resistance both of which are so dimensioned that the discharge requires a certain duration only which is determined by the prescribed accuracy. A time signal can only lay claim to accuracy if its own duration is not already so long that it exceeds itself the permissible limit of error. If high demands are made as to accuracy of the signal the duration of the signal itself must also be accurately dimensioned and for this dimensioning the condenser with its discharge current is an expedient which is as simple as it is satisfactory. The condenser enables the signal to be transmitted to distances either by wires or wireless.

An embodiment of my invention is illustrated by way of example in the drawing affixed to this specification.

Refering to the drawing it will be seen that the condenser 1 is connected with the source of current 3 by means of a change-over switch 2 when the latter is in the position indicated in the drawing by broken lines.

When a time signal is to be given the switch 2 is turned into the position shown in full lines. The discharge current of the condenser then flows through the ohmic resistance 4 and the self-induction 5 which together are so dimensioned that the discharge of the condenser is finished within a certain length of time which lies below the permissible limit of error. The discharge current from the condenser 1 decreased in the self-induction coil 5 induces in the coil 6 a current which charges the condenser 7. In the extinguishing spark distance 9 a series of partial discharges are then generated each of which produces damped oscillations in the oscillation circuit formed by the capacity 7 and the self-induction 8. These damped oscillations excite a tuned oscillation circuit formed by the self-inductions 10 and 11 and the capacity 12. The oscillations passing through the coil 11 are radiated by the aerial or antenna 13. The accuracy with which the discharge circuit of the condenser 1 can be computed and constructed is an absolute guarantee that the duration of the signals sent out keep exactly the prescribed time.

Time signals of the accuracy ensured by my invention are, for instance, necessary if from the speed of propagation of vibrations of the surface of the earth conclusions are to be drawn in regard to its condition. The vibrations are caused by blasting charges (Mintrop blasting). In order to ignite the blasting charge an electric contact is closed. Simultaneously with this operation the switch 2 can be turned into the position shown in full lines in the drawing. The time signals radiated by the aerial 13 are received at the various remote points where seismographs are erected.

What I claim as my invention is:—

1. Means for transmitting time signals with a prescribed accuracy comprising in combination, a condenser, a source of electric current, means for connecting said condenser with said source for charging it, an electric circuit containing a self-induction coil and an ohmic resistance, means for connecting said condenser with said circuit so that said condenser is discharged across said circuit, said self-induction coil and said ohmic resistance being so dimensioned that the duration of the discharge current lies within the prescribed accuracy limits, and means adapted to transmit signals by the aid of said discharge current.

2. Means for transmitting time signals with a prescribed accuracy comprising in combination, a condenser, a source of electric current, means for connecting said condenser with said source for charging it, an electric circuit containing a self-induction coil and an ohmic resistance means for connecting said condenser with said circuit so that said condenser is discharged across said circuit, said self-induction coil and said ohmic resistance being so dimensioned that the duration of the discharge current lies within the prescribed accuracy limits, an oscillating circuit containing an induction coil, a condenser and an extinguishing spark distance, and means for transmitting signals by the aid of the partial discharges from said extinguishing spark distance.

3. Means for transmitting time signals with a prescribed accuracy comprising in combination, a condenser, a source of electric current, means for connecting said condenser with said source for charging it, an electric circuit containing a self-induction coil and an ohmic resistance, means for connecting said condenser with said circuit so that said condenser is discharged across said circuit, said self-induction coil and said ohmic resistance being so dimensioned that the duration of the discharge current lies within the prescribed accuracy limits, an oscillating circuit containing an induction coil in which a current is adapted to be induced by the discharge current from the condenser in the first circuit, a condenser adapted to be charged by said induced current, an extinguishing spark distance, a capacity and a self-induction, and means for transmitting signals by the aid of the damped oscillations in said oscillating circuit.

4. Means for transmitting time signals with a prescribed accuracy comprising in combination, a condenser, a source of electric current, means for connecting said condenser with said source for charging it, an electric circuit containing a self-induction coil and an ohmic resistance, means for connecting said condenser with said circuit so that said condenser is discharged across said circuit, said self-induction coil and said ohmic resistance being so dimensioned that the duration of the discharge current lies within the prescribed accuracy limits, an oscillating circuit containing an induction coil in which a current is adapted to be induced by the discharge current from the condenser in the first circuit, a condenser adapted to be charged by said induced current, an extinguishing spark distance, a capacity and a self-induction, a tuned oscillating circuit containing self-inductions and a capacity and adapted to be excited by said first oscillating circuit and an aerial for radiating the oscillations of said tuned oscillating circuit.

In testimony whereof I affix my signature.

HANS RIEGGER.